(12) United States Patent
Mori

(10) Patent No.: US 10,974,695 B2
(45) Date of Patent: Apr. 13, 2021

(54) NOTIFICATION SYSTEM

(71) Applicant: HONDA MOTOR CO., LTD., Tokyo (JP)

(72) Inventor: Takashi Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 15/765,734

(22) PCT Filed: Sep. 28, 2016

(86) PCT No.: PCT/JP2016/078609
§ 371 (c)(1),
(2) Date: Apr. 4, 2018

(87) PCT Pub. No.: WO2017/068921
PCT Pub. Date: Apr. 27, 2017

(65) Prior Publication Data
US 2018/0290622 A1 Oct. 11, 2018

(30) Foreign Application Priority Data
Oct. 21, 2015 (JP) ................................ 2015-207266

(51) Int. Cl.
*B60R 25/102* (2013.01)
*H04M 11/00* (2006.01)
(Continued)

(52) U.S. Cl.
CPC ............ *B60R 25/102* (2013.01); *B60R 25/01* (2013.01); *B60R 25/104* (2013.01); *G07C 5/008* (2013.01);
(Continued)

(58) Field of Classification Search
CPC .... B60R 25/104; G07C 5/008; G07C 5/0825; G07C 9/00; G08B 21/00; G08B 21/24; H04M 1/72577; H04M 11/00
(Continued)

(56) References Cited

U.S. PATENT DOCUMENTS 10,083,588 B1 * 9/2018 Kapoor ................. B60W 50/14
2005/0283286 A1 * 12/2005 Kanda ................. B60R 16/0232
701/29.6

(Continued)

FOREIGN PATENT DOCUMENTS

CN 105453531 3/2016
JP 2005-240349 9/2005
(Continued)

OTHER PUBLICATIONS

International Search Report and Written Opinion for International Application No. PCT/JP2016/078609 dated Dec. 20, 2016.
(Continued)

*Primary Examiner* — Peter D Nolan
*Assistant Examiner* — Wae L Louie
(74) *Attorney, Agent, or Firm* — Amin, Turocy & Watson, LLP

(57) ABSTRACT

A notification system includes an in-vehicle communication device mounted on a vehicle to transmit state information regarding the vehicle to surroundings of the vehicle and a mobile terminal including a receiving unit which receives the state information from the in-vehicle communication device. The mobile terminal further includes a notification unit which performs a notification operation for a user, a first determination unit which determines whether or not the notification operation for the user is necessary on the basis of the state information received by the receiving unit, a second determination unit which acquires position informa-
(Continued)

tion of at least one of the mobile terminal or the vehicle and determines whether or not the acquired position information is within a preset notification-prohibited area, and a determination control unit which determines whether or not to cause the notification unit to perform the notification operation on the basis of determination results of the first determination unit and the second determination unit.

12 Claims, 8 Drawing Sheets

(51) Int. Cl.
| | | |
|---|---|---|
| G08B 21/00 | (2006.01) | |
| G08B 21/24 | (2006.01) | |
| G07C 9/00 | (2020.01) | |
| H04M 1/725 | (2021.01) | |
| G07C 5/08 | (2006.01) | |
| G07C 5/00 | (2006.01) | |
| B60R 25/01 | (2013.01) | |
| B60R 25/104 | (2013.01) | |
| G08B 21/18 | (2006.01) | |
| H04M 1/60 | (2006.01) | |
| G08B 25/08 | (2006.01) | |
| H04M 1/67 | (2006.01) | |

(52) U.S. Cl.
CPC ............. *G07C 5/0825* (2013.01); *G07C 9/00* (2013.01); *G08B 21/00* (2013.01); *G08B 21/24* (2013.01); *H04M 1/72577* (2013.01); *H04M 11/00* (2013.01); *B60R 2325/205* (2013.01); *G07C 2209/62* (2013.01); *G08B 21/182* (2013.01); *G08B 21/187* (2013.01); *G08B 25/08* (2013.01); *H04M 1/6091* (2013.01); *H04M 1/67* (2013.01); *H04M 2250/10* (2013.01)

(58) Field of Classification Search
USPC .............................................................. 701/2
See application file for complete search history.

(56) References Cited

U.S. PATENT DOCUMENTS

| | | | | |
|---|---|---|---|---|
| 2015/0243156 | A1* | 8/2015 | Itoh | H04W 4/00 340/539.11 |
| 2018/0120821 | A1* | 5/2018 | Ayyagari | H04W 4/16 |
| 2018/0290622 | A1* | 10/2018 | Mori | H04M 1/72577 |
| 2019/0173826 | A1* | 6/2019 | DeLuca | G06Q 10/107 |

FOREIGN PATENT DOCUMENTS

| | | |
|---|---|---|
| JP | 2006-33777 | 2/2006 |
| JP | 2006-235823 | 9/2006 |
| JP | 2014-72672 | 4/2014 |

OTHER PUBLICATIONS

Chinese Office Action for Chinese Patent Application No. 201680058507.X dated May 20, 2019.

* cited by examiner

FIG. 5

| [VEHICLE STATE LIST] | Status |
|---|---|
| LOCK STATE | Unlock |
| SECURITY SETTING STATE | Unset |
| POWER SUPPLY STATE | Off |
| DOOR OPEN/CLOSED STATE | Close |
| HEADLIGHTS | Off |
| HAZARD | Off |

| [WARNING LIST] | Status |
|---|---|
| LOCK STATE | Unlock |
| SECURITY SETTING STATE | Unset |

IM2

NOTIFICATION SYSTEM

TECHNICAL FIELD

The present invention relates to a notification system.

Priority is claimed on Japanese Patent Application No. 2015-207266, filed Oct. 21, 2015, the content of which is incorporated herein by reference.

BACKGROUND ART

An operation forgetting notification system including an in-vehicle notification device which is communicably connected to a mobile terminal held by a user and transmits information regarding operation forgetting to the user in the vehicle via a center or through direct communication is known in the related art (for example, see Patent Literature 1). In this operation forgetting notification system, when the mobile terminal registered in advance has received the information regarding operation forgetting from the vehicle, the mobile terminal notifies the user of the information.

CITATION LIST

Patent Literature

[Patent Literature 1]
  Japanese Unexamined Patent Application, First Publication No. 2005-240349

SUMMARY OF INVENTION

Technical Problem

However, in the operation forgetting notification system described above, the in-vehicle notification device merely determines whether or not the user has forgotten an operation in accordance with a predetermined determination condition. Therefore, the operation forgetting notification system has the problem that the user's intention cannot be taken into account and a state intended by the user and a state in which an operation has been forgotten cannot be identified appropriately. In the case in which, to address such problems, the mobile terminal provides notification to the user via the center using exiting of the mobile terminal from a range of direct communication with the vehicle as a condition of starting the determination as to whether or not an operation has been forgotten, communication sometimes cannot be performed depending on the state of the vehicle or the mobile terminal.

For example, notification may sometimes not be provided to the user when the vehicle is present in a place such as underground where it is not possible to communicate with the center or when the mobile terminal is left behind in the car.

The present invention has been made in view of such circumstances and it is an object of the invention to provide a notification system which can improve the user's convenience.

Solution to Problem (1) A notification system according to an aspect of the present invention includes an in-vehicle communication device mounted on a vehicle and configured to transmit state information regarding the vehicle to surroundings of the vehicle, and a mobile terminal including a receiving unit configured to receive the state information from the in-vehicle communication device, wherein the mobile terminal further includes a notification unit configured to perform a notification operation for a user, a first determination unit configured to determine whether or not the notification operation for the user is necessary on the basis of the state information received by the receiving unit, a second determination unit configured to acquire position information of at least one of the mobile terminal or the vehicle and to determine whether or not the acquired position information is within a preset notification-prohibited area, and a determination control unit configured to determine whether or not to cause the notification unit to perform the notification operation on the basis of determination results of the first determination unit and the second determination unit.

(2) In the above aspect (1), the determination control unit may be configured to determine not to cause the notification unit to perform the notification operation when the first determination unit has determined that the notification operation is necessary and the second determination unit has determined that the mobile terminal or the vehicle is present within the notification-prohibited area.

(3) In the above aspect (2), the first determination unit may be configured to compare the state information received by the receiving unit with a preset reference state that is a state of the vehicle in which the notification operation is unnecessary and to determine that the notification operation is necessary when a result of the comparison is that the received state information and the preset reference state are different.

(4) In any one of the above aspects (1) to (3), the in-vehicle communication device may be configured to periodically transmit the state information regarding the vehicle, and the first determination unit may be configured to determine whether or not a position of the mobile terminal has changed from being inside a communication range of the in-vehicle communication device to outside the communication range on the basis of a reception result of the receiving unit and to determine, when it is determined that the position of the mobile terminal has changed from being inside the communication range of the in-vehicle communication device to outside the communication range, whether or not the notification operation is necessary on the basis of the state information received immediately before the change.

(5) In the above aspect (4), the first determination unit may be configured to determine whether or not the notification operation is necessary on the basis of the state information when a predetermined time has elapsed since acquisition of alighting information indicating establishment of an alighted condition included in the state information.

(6) In the above aspect (5), the first determination unit may be configured not to determine whether or not the notification operation is necessary when boarding information indicating establishment of a boarded condition included in the state information is acquired until the predetermined time elapses since the acquisition of the alighting information indicating establishment of the alighted condition included in the state information.

(7) In any one of the above aspects (4) to (6), the mobile terminal may further include a behavior detection unit configured to detect whether or not the mobile terminal is in a stationary state, wherein the first determination unit is configured to determine whether or not the notification operation is necessary on the basis of the state information when alighting information indicating establishment of an alighted condition included in the state information has been acquired, it is determined that the position of the mobile terminal is within the communication range on the basis of the reception result of the receiving unit, and it is detected by the behavior detection unit that the mobile terminal is in the stationary state.

(8) In any one of the above aspects (5) to (7), the alighted condition may be established when it is detected that any door of the vehicle is brought into an open state from a closed state when the vehicle is stopped.

(9) In the above aspect (4), the first determination unit may be configured to determine that the position of the mobile terminal has changed from being inside a communication range of the in-vehicle communication device to outside the communication range when an electric field strength in the reception result when the receiving unit periodically receives the state information has changed from a state in which the electric field strength is greater than or equal to a reference to a state in which the electric field strength is less than the reference.

(10) In the above aspect (3), the mobile terminal may further include a change receiving unit configured to receive a change of the reference state from the user.

(11) In the above aspect (5), the mobile terminal may further include a change receiving unit configured to receive a change of the predetermined time from the user.

(12) In the above aspect (9), the mobile terminal may further include a change receiving unit configured to receive a change of the reference of the electric field strength from the user.

Advantageous Effects of Invention

According to the above aspects (1) to (3), the determination control unit is configured to determine whether or not to cause the notification unit configured to perform a notification operation to perform the notification operation on the basis of determination results of the first determination unit and the second determination unit. Therefore, it is possible to appropriately provide notification that the vehicle is in an undesired state without the user's intention and also to prevent provision of an annoying notification to the user. As a result, the notification system can improve the user's convenience.

According to the above aspect (4), the first determination unit is configured to determine, when it is determined that the position of the mobile terminal has changed from being inside the communication range of the in-vehicle communication device to outside the communication range, whether or not the notification operation is necessary on the basis of the state information received immediately before the change. Therefore, it is possible to accurately determine whether or not the notification operation is necessary.

According to the aspect of the above (5), the first determination unit is configured to determine whether or not the notification operation is necessary on the basis of the state information when a predetermined time has elapsed since acquisition of the alighting information. Therefore, when the mobile terminal is staying for a predetermined time in the vicinity of the position where the vehicle is parked, that is, for example when a user who holds the mobile terminal is staying for a predetermined time in a room, a shop, or the like near where the vehicle is parked, it is possible to perform the notification operation as necessary even if the mobile terminal has not exited the communication range.

According to the aspect of the above (6), the first determination unit is configured not to determine whether or not the notification operation is necessary when boarding information indicating establishment of a boarded condition included in the state information is acquired until the predetermined time elapses since the acquisition of the alighting information indicating establishment of the alighted condition included in the state information. Thus, the notification operation is not performed when the user holding the mobile terminal once alights from the vehicle but immediately boards the vehicle. Therefore, it is possible to suppress unnecessary notification.

According to the above mode (7), the first determination unit is configured to determine whether or not the notification operation is necessary on the basis of the state information when alighting information has been acquired and it is detected by the behavior detection unit that the mobile terminal is in the stationary state within the communication range. Therefore, when the mobile terminal is stationary at a position such as in the vicinity of the position where the vehicle is parked, that is, for example when the user places the mobile terminal on a table or the like in a room or a shop near where the vehicle is parked, it is possible to perform the notification operation as necessary even if the mobile terminal has not exited the communication range.

According to the aspect of the above (9), the first determination unit is configured to determine that the position of the mobile terminal has changed from being inside a communication range of the in-vehicle communication device to outside the communication range when an electric field strength upon the mobile terminal periodically receiving the state information has changed from a state in which the electric field strength is greater than or equal to a reference to a state in which the electric field strength is less than the reference. Therefore, for example, by setting a reference regarding the average value of the electric field intensity or the like, it is possible to reduce variation due to the user's way of holding the mobile terminal or radio wave environment around the vehicle and to make the determination at some predetermined distance.

According to the above mode (10), the mobile terminal further includes a change receiving unit configured to receive a change of the reference state from the user. Therefore, it is possible to perform setting according to the user's usage and to further improve the convenience.

According to the above mode (11), the mobile terminal further includes a change receiving unit configured to receive a change of the predetermined time from the user. Therefore, it is possible to perform setting according to the user's usage and to further improve the convenience.

According to the above mode (12), the mobile terminal further includes a change receiving unit configured to receive a change of the reference of the electric field strength from the user. Therefore, it is possible to perform setting according to the user's usage and to further improve the convenience.

BRIEF DESCRIPTION OF DRAWINGS

FIG. 5 is a diagram showing an exemplary interface screen displayed on a touch panel.

FIG. 6 is a diagram showing another interface screen.

DESCRIPTION OF EMBODIMENTS

Hereinafter, embodiments of a notification system of the present invention will be described with reference to the drawings.

First Embodiment

Figure 1:
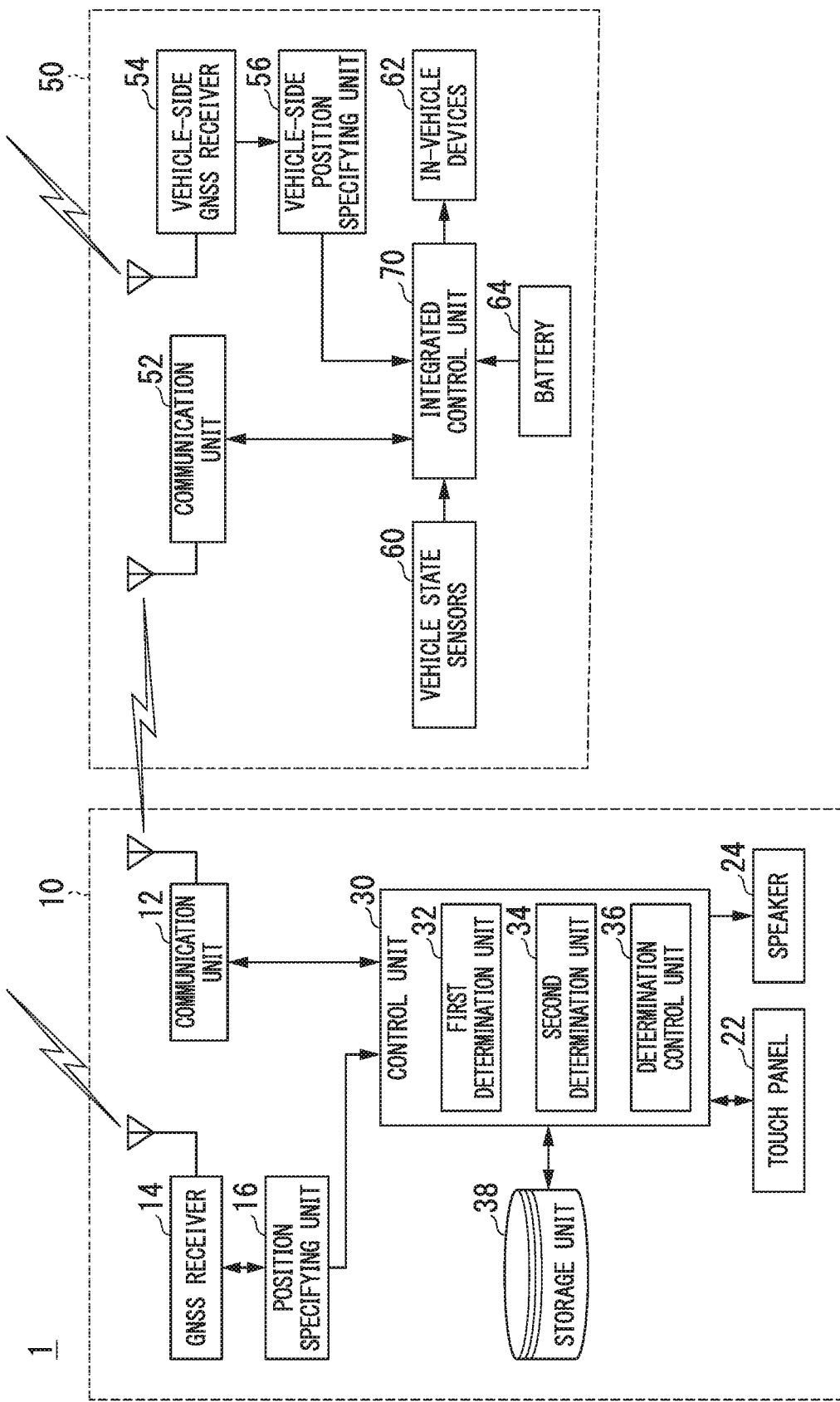
FIG. 1 is a diagram showing a configuration of a notification system.

FIG. 1 is a diagram showing a configuration of a notification system 1. The notification system 1 includes a mobile terminal 10 and a communication unit 52 mounted on a vehicle 50. The mobile terminal 10 includes a communication unit 12, a global navigation satellite system (GNSS) receiver 14, a position specifying unit 16, a touch panel 22, a speaker 24, a control unit 30, and a storage unit 38.

For example, the control unit 30 is realized by a processor such as a central processing unit (CPU) executing a program. The control unit 30 may also be realized by hardware such as a large scale integration (LSI), an application specific integrated circuit (ASIC), or a field-programmable gate array (FPGA). The storage unit 38 is realized by a storage device such as a random access memory (RAM), a read only memory (ROM), a hard disk drive (HDD), or a flash memory.

The communication unit 12 receives information from the vehicle 50 by performing wireless communication with the vehicle 50. The mobile terminal 10 periodically communicates with the vehicle 50, for example, by Bluetooth (registered trademark), a wireless local area network (LAN), or the like. The GNSS receiver 14 receives radio waves from a plurality of satellites constituting, for example, the global positioning system (GPS), the GLONASS, the Galileo, or the like. The position specifying unit 16 specifies the position of the mobile terminal by performing positioning calculation on the basis of radio waves received by the GNSS receiver 14. The mobile terminal 10 may also receive information indicating the position of the mobile terminal from a device (an access point or a radio base station) connectable via a wireless LAN.

The touch panel 22 is formed by superimposing a display unit such as a liquid crystal display (LCD) or an organic electroluminescence (EL) and an input unit which can detect the touch position of an operator by a coordinates detection mechanism. The display unit displays a graphical user interface (GUI) switch for operation. When detecting a touch operation, a flick operation, a swipe operation, or the like on the GUI switch, the input unit generates an operation signal indicating that the touch operation has been performed on the GUI switch and outputs the operation signal to the control unit 30.

The speaker 24 outputs data of various sounds or signal sounds stored in the control unit 30 according to a signal from the control unit 30. The speaker 24 outputs, for example, a warning sound recognizable by a user holding the mobile terminal 10.

The control unit 30 includes a first determination unit 32, a second determination unit 34, and a determination control unit 36. The first determination unit 32 determines whether or not a notification operation for the user is necessary on the basis of state information received by the communication unit 12. The notification operation is, for example, an operation of causing the touch panel 22 or the speaker 24 to output state information. The second determination unit 34 acquires position information of at least one of the mobile terminal or the vehicle 50 and determines whether or not the acquired position information is within a preset notification-prohibited area. The notification-prohibited area is an area in which the notification operation is prohibited, which is set in advance by the user.

On the basis of the determination results of the first determination unit 32 and the second determination unit 34, the determination control unit 36 determines whether or not to cause a notification unit configured to perform the notification operation such as the touch panel 22 or the speaker 24 to perform the notification operation. For example, when the first determination unit 32 determines that the notification operation is necessary and the second determination unit 34 determines that the mobile terminal or the vehicle 50 is present within the notification-prohibited area, the determination control unit 36 determines not to perform the notification operation. Details of the processing of the control unit 30 will be described later.

A communication unit 52, a vehicle-side GNSS receiver 54, a vehicle-side position specifying unit 56, various vehicle state sensors 60, various in-vehicle devices 62, a battery 64, and an integrated control unit 70 are mounted on the vehicle 50. The communication unit 52 performs wireless communication with the mobile terminal 10 under the control of the integrated control unit 70. The communication unit 52 transmits state information regarding the vehicle 50, which will be described later, to a predetermined communication range around the vehicle. The communication unit 52 periodically transmits state information regarding the vehicle 50 at predetermined intermittent time intervals. The vehicle-side GNSS receiver 54 receives radio waves from a plurality of satellites, for example, from a plurality of GPS satellites. The vehicle-side position specifying unit 56 specifies the position of the vehicle by performing positioning calculation on the basis of radio waves received by the vehicle-side GNSS receiver 54.

Further, the vehicle 50 may acquire information indicating the position of the vehicle from another vehicle or a device (an access point or a radio base station) connectable via a wireless LAN. The vehicle-side position specifying unit 56 may specify the position of the vehicle by combining radio waves received by the vehicle-side GNSS receiver 54 with another technique. The other technique is, for example, a method of deriving a change in position of the vehicle on the basis of detection results of an acceleration sensor (not shown) or a gyro sensor (not shown) mounted on the vehicle.

The various vehicle state sensors 60 detect various states of the vehicle 50. Examples of the various vehicle state sensors 60 include an ignition switch, door lock state sensors, door switches, a communication state sensor, switches of the various in-vehicle devices 62, and a speed sensor. The ignition switch detects an operation state of an internal combustion engine or a motor which is a traveling drive source of the vehicle 50. The door lock state sensors detect unlocked or locked states of door lock units provided on doors of the vehicle 50. The door switches detect open/closed states of the doors provided on the vehicle 50. The communication state sensor detects an operation mode of an in-vehicle network such as a CAN communication line which is a general-purpose communication line. The switches of the various in-vehicle devices 62 detect operation states of the various in-vehicle devices 62. The speed sensor detects the speed of the vehicle.

The in-vehicle devices 62 are, for example, a door lock unit, an air conditioner, a display device, or a hazard light. The battery 64 is a storage battery that supplies power to the vehicle 50.

The integrated control unit 70 performs overall control of the vehicle 50. The integrated control unit 70 communicates with the mobile terminal 10 at predetermined intermittent time intervals after establishing a wireless communication connection with the mobile terminal 10. The integrated control unit 70 periodically transmits a signal including state information regarding the vehicle 50 through mutual communication with the mobile terminal 10.

The state information regarding the vehicle 50 includes, for example, information as to whether the ignition switch is on or off, whether each door lock unit is in an unlocked state or in a locked state, whether each door is in an open state or in a closed state, whether the communication unit 52 is in a sleeping state or an awake state, whether the in-vehicle communication network is in a power saving state or in a normal state, or whether a power supply of the in-vehicle devices is on or off.

Figure 2:
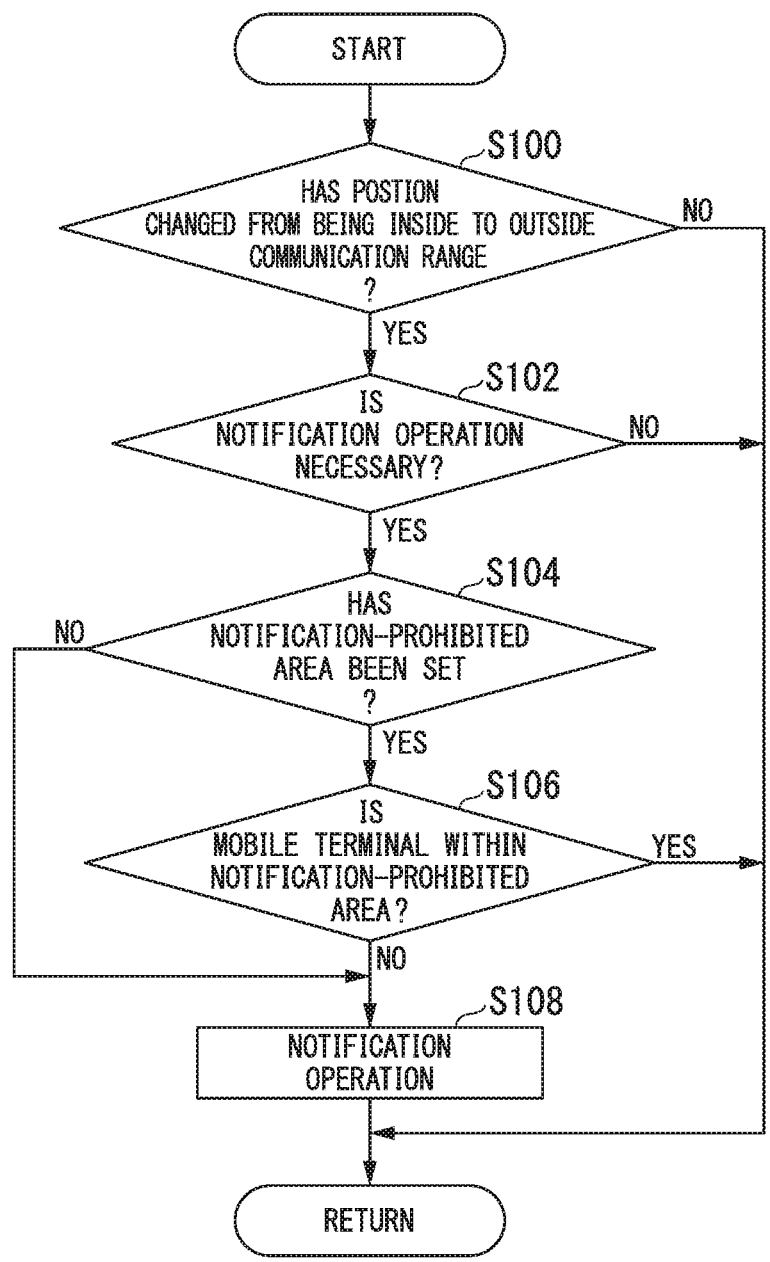
FIG. 2 is a flowchart showing a flow of processes executed by a control unit of a mobile terminal.

FIG. 2 is a flowchart showing a flow of processes executed by the control unit 30 of the mobile terminal 10. First, the control unit 30 determines whether or not the mobile terminal 10 has changed in position from being inside the communication range of the communication unit 52 to outside the communication range (step S100). For example, when an electric field strength upon the mobile terminal periodically receiving the state information regarding the vehicle 50 has changed from a state in which the electric field strength is greater than or equal to a standard to a state in which it is less than the standard, the first determination unit 32 of the control unit 30 determines that the mobile terminal has changed in position from being inside the communication range of the communication unit 52 to outside the communication range. The first determination unit 32 may also determine whether or not a time average value of the electric field intensity has changed from a state in which the time average value is greater than or equal to a standard to a state in which it is less than the standard. For example, when the electric field strength upon the mobile terminal periodically receiving the state information regarding the vehicle 50 has changed from a state in which the electric field strength is greater than or equal to a standard to a state in which it is less than the standard, the first determination unit 32 determines that the mobile terminal 10 has changed in position from being inside the communication range of the communication unit 52 to outside the communication range and disconnects communication with the vehicle 50.

When it is determined that the mobile terminal 10 has not changed in position from being inside the communication range of the communication unit 52 to outside the communication range, one routine of this flowchart ends.

When the mobile terminal 10 has changed in position from being inside the communication range of the communication unit 52 to outside the communication range, the first determination unit 32 of the mobile terminal 10 determines whether or not the notification operation is necessary (step S102). The first determination unit 32 determines whether or not a result of comparison between state information regarding the vehicle 50 received immediately before reception of radio waves stops (immediately before the mobile terminal 10 changes to being outside the communication range of the communication unit 52) and a preset reference state(s) of the vehicle 50 in which the notification operation is unnecessary is that the state information regarding the vehicle 50 is different from the preset reference state. The reference states of the vehicle 50 are preset, for example, by the user. The reference states of the vehicle 50 are desired states of the vehicle 50 when the user has alighted from the vehicle 50. Examples of the reference states of the vehicle 50 include an off state of the ignition switch, a locked state of each door lock unit, a closed state of each door, a sleeping state of the communication unit 52, a power saving state of the in-vehicle communication network, and a power off state of the in-vehicle devices. The reference states of the vehicle 50 may also include a state in which a trunk door which is provided to open or close the opening portion of a trunk of the vehicle 50 is closed or a state in which the hazard light is off.

The determination control unit 36 of the control unit 30 determines that the notification operation is necessary when the first determination unit 32 has determined that the result of comparison between the state information regarding the vehicle 50 and the reference state(s) is that the state information is different from the reference state. The determination control unit 36 determines that the notification operation is necessary, for example, when the ignition switch is in an ON state, the door lock unit is in an unlocked state, a door is in an open state, or the like which are different from the reference states. The determination control unit 36 may also determine that the notification operation is necessary when a preset condition is satisfied. The set condition is, for example, a state in which a door lock unit is locked in a state in which the trunk door which is provided to open or close the opening portion of the trunk of the vehicle 50 is open or a state in which a door lock unit is locked in a state in which the hazard light is lit.

On the other hand, the determination control unit 36 of the control unit 30 determines that the notification operation is unnecessary when the result of comparison by the first determination unit 32 between the state information regarding the vehicle 50 and the reference states is that the state information regarding the vehicle 50 is not different from the reference states.

When it is determined that the notification operation is unnecessary, the procedure of one routine of this flowchart ends.

When it is determined that the notification operation is necessary, the second determination unit 34 determines whether or not the notification-prohibited area has been set (step S104). The notification-prohibited area is an area which is set in advance by the user and prohibits the notification operation even when the condition in which the notification operation is necessary is satisfied. When the notification-prohibited area has not been set, the determination control unit 36 causes the touch panel 22 or the speaker 24 to perform the notification operation (step S108).

When the notification-prohibited area has been set, the second determination unit 34 determines whether or not the mobile terminal 10 is located within the notification-prohibited area (step S106). When the mobile terminal 10 is located within the notification-prohibited area, the determination control unit 36 terminates one routine of this flowchart without causing the notification operation to be performed. When the mobile terminal 10 is not located within the notification-prohibited area, the determination control unit 36 causes the touch panel 22 or the speaker 24 to perform the notification operation (step S108). Then, one routine of this flowchart ends.

In this procedure, it is determined whether or not the position of the mobile terminal 10 is within the notification-prohibited area. However, it may be determined whether or not the position of the vehicle 50, instead of the position of the mobile terminal 10, is within the notification-prohibited area. In this case, the control unit 30 does not cause the notification operation to be performed when the position of the vehicle 50 is within the notification-prohibited area. The control unit 30 may not cause the notification operation to be performed when both the mobile terminal 10 and the vehicle 50 are present within the notification-prohibited area.

Figure 3:
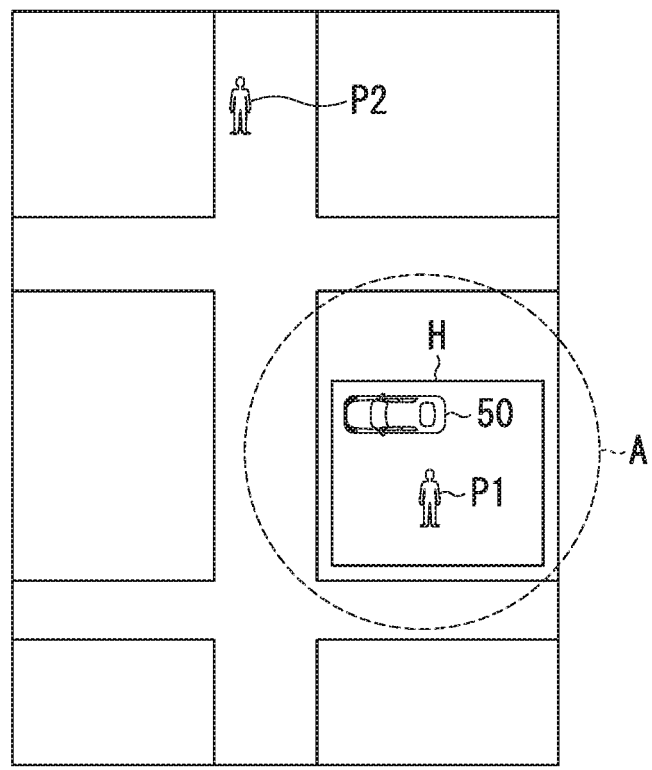
FIG. 3 is a diagram showing an exemplary notification-prohibited area.

Through the above procedure, even when it is determined that the notification operation is necessary, the control unit 30 does not cause the touch panel 22 or the speaker 24 to perform the notification operation, for example, if the mobile terminal 10 is located within the notification-prohibited area. FIG. 3 is a diagram showing an example of the notification-prohibited area. In the case in which a notification-prohibited area A has been set by the user, even when it is determined that the notification operation is necessary, the control unit 30 does not cause the touch panel 22 or the speaker 24 to perform the notification operation if a user holding the mobile terminal 10 is present at a position P1 within the notification-prohibited area A. On the other hand, when it is determined that the notification operation is necessary, the control unit 30 causes the touch panel 22 or the speaker 24 to perform the notification operation if the user holding the mobile terminal 10 is present at a position P2 outside the notification-prohibited area A. As a result, the notification system 1 can perform the notification operation when necessary and can prevent provision of an annoying notification when the notification operation is unnecessary.

For example, when the user has stopped the vehicle 50 at a garage of home H with the door lock unit of the vehicle 50 unlocked, the first determination unit 32 may determine that the notification operation is necessary if the state in which the door lock unit of the vehicle 50 is unlocked is different from the reference state. In the present embodiment, even in such a case, the determination control unit 36 does not cause the notification operation to be performed when the second determination unit 34 has determined that the mobile terminal 10 is present within the notification-prohibited area. This can prevent provision of an annoying notification to the user when the vehicle 50 is stopped at a place where locking is unnecessary.

Figure 4:
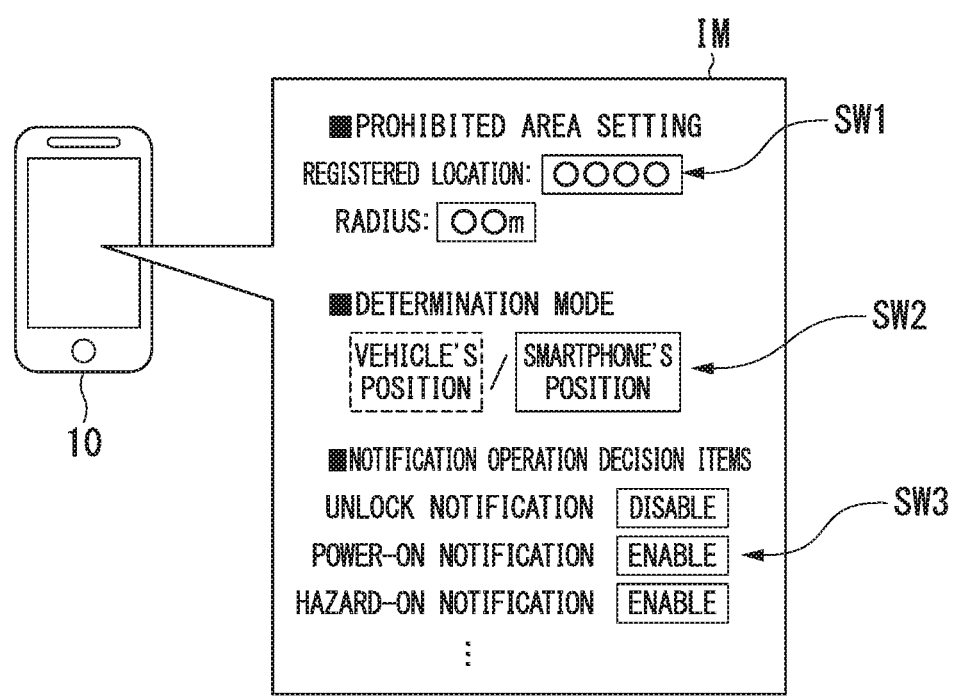
FIG. 4 is a diagram showing an exemplary interface screen for setting a notification-prohibited area and reference state decision items.

Setting of the notification-prohibited area and reference state decision items will now be described. FIG. 4 is a diagram showing an exemplary interface screen IM for setting the notification-prohibited area and the reference state decision items. The control unit 30 causes the interface screen IM to be displayed on the display unit of the touch panel 22 according to the user's operation on the touch panel 22. For example, a switch SW1 for setting the notification-prohibited area, a switch SW2 for setting a determination mode, and switches SW3 for setting notification operation decision items are displayed on the interface screen IM. The control unit 30 causes the storage unit 38 to store information set according to the user's operation of the switches SW1 to SW3.

The user sets the notification-prohibited area by operating the switch SW1. The user sets the notification-prohibited area, for example, by setting a center position and a radius from the center position of the notification-prohibited area to be registered.

The user sets the determination mode by operating the switch SW2. The user sets whether the notification operation is not performed when the mobile terminal 10 is present within the notification-prohibited area or when the vehicle 50 is present within the notification-prohibited area. For example, when the user has set that the notification operation is not performed when the vehicle 50 is present within the notification-prohibited area, the control unit 30 does not cause the touch panel 22 or the speaker 24 to perform the notification operation if the vehicle 50 is located within the control prohibition area even when it is determined that the notification operation is necessary. On the other hand, if the vehicle 50 is located outside the notification-prohibited area, the control unit 30 causes the touch panel 22 or the speaker 24 to perform the notification operation when it is determined that the notification operation is necessary. The user may set that the notification operation is not performed when both the mobile terminal 10 and the vehicle 50 are present within the notification-prohibited area.

The user sets the reference state decision items by operating the switches SW3. The control unit 30 determines whether or not reference states for which reference state decision items have been set differ from the state information regarding the vehicle 50. As shown, when notification of unlocking of the doors of the vehicle 50 has been set disabled, the first determination unit 32 determines that the notification operation is unnecessary even if a door lock of the vehicle 50 is in an open state. As shown, when power-on notification and hazard-on notification has been set enabled, the first determination unit 32 determines that the notification operation is necessary if the power supply is on or the hazard is on. The switches SW3 for setting the reference state decision items include, for example, switches for setting the locked state of each door lock unit, the sleep state of the communication unit 52, the power saving state of the in-vehicle communication network, the power supply off state of the in-vehicle devices, or the like as the reference states.

An interface screen for information (see step S108) which the determination control unit 36 outputs to the touch panel 22 as the notification operation will now be described. FIG. 5 is a diagram showing an exemplary interface screen IM1 displayed on the touch panel 22. For example, the determination control unit 36 causes the touch panel 22 to display a plurality of items to be notified as a status list of the vehicle 50.

The items to be notified are, for example, the locked state (LOCK) or the unlocked state (UNLOCK) of the door lock unit, a predetermined security state (SECURITY SETTING STATE), the power on or off state (POWER SUPPLY STATE), the door open/closed state (DOOR OPEN/CLOSED STATE), the lit state of the headlights (HEADLIGHTS), and the lit state of the hazard light (HAZARD). The determination control unit 36 highlights and displays items for which the received state information regarding the vehicle 50 and the preset reference states are different. In the shown example, a door locked state and a security-set state are set as the reference states. In this case, if a door is in an open state and no security is set in the received state information regarding the vehicle 50, the items of the unlocked state (Unlock) of each door lock unit and the unset state (Unset) of the predetermined security, for which the received state information regarding the vehicle 50 is different from the preset reference states, are highlighted.

FIG. 6 is a diagram showing another interface screen IM2. The determination control unit 36 may display only items for which the received state information regarding the vehicle 50 is different from the preset reference states, as a warning list, among the plurality of items to be notified. In the shown example, the items of the unlocked state (Unlock) of the door lock unit and the unset state (Unset) of the predetermined security, for which the received state information regarding the vehicle 50 is different from the preset reference states, are displayed on the interface screen IM2.

Figure 7:
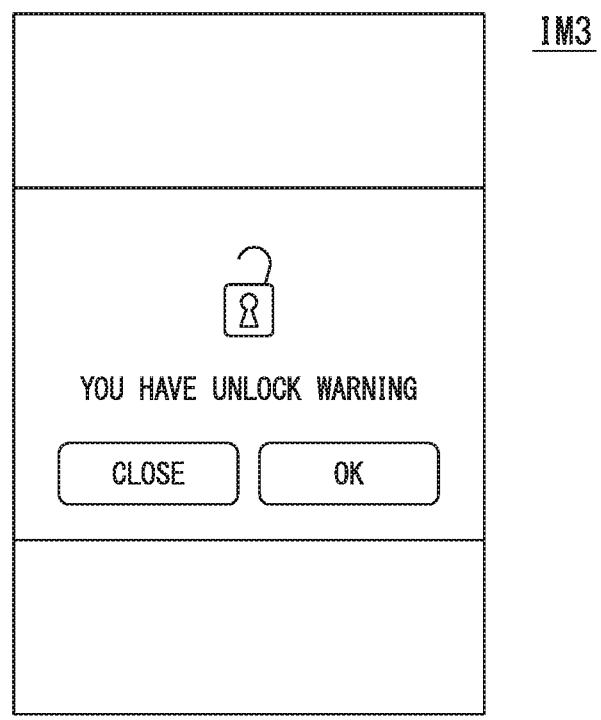
FIG. 7 is a diagram showing another interface screen.

FIG. 7 is a diagram showing another interface screen IM3. The determination control unit 36 may display an item for which the received state information regarding the vehicle 50 is different from a preset reference state among the plurality of items to be notified and then display a switch for closing the interface screen showing the displayed item and a switch for inputting the confirmation of the displayed item on the screen. In the shown example, the preset reference state is a state in which the vehicle 50 is locked and the interface screen is displayed on the display unit when the received state information regarding the vehicle 50 indicates an unlocked state.

According to the first embodiment described above, the notification operation is performed as necessary when it is determined that the mobile terminal 10 has changed in position from being inside the communication range of the communication unit 52 to outside the communication range and that the mobile terminal or the vehicle 50 is not present within the notification-prohibited area. Therefore, it is possible to appropriately provide notification that the vehicle 50 is in an undesired state without the user's intention and also to prevent provision of an annoying notification to the user. As a result, the notification system 1 can improve the user's convenience.

Second Embodiment

A second embodiment will be described below. In the notification system 1 according to the first embodiment, the notification operation is performed as necessary when the mobile terminal 10 has changed in position from being inside the communication range of the communication unit 52 to outside the communication range and the mobile terminal or the vehicle 50 is not present within the notification-prohibited area. However, in a notification system 1 according to the second embodiment, even if the mobile terminal 10 is present within the communication range of the communication unit 52, when a predetermined time has elapsed in a state in which an alighted condition is established and the mobile terminal or the vehicle 50 is not present within the notification-prohibited area, the notification operation is performed as necessary regardless of the presence of the mobile terminal 10 within the communication range of the communication unit 52. Differences from the notification system 1 of the first embodiment will be mainly described below.

When alighting information indicating establishment of an alighted condition included in the state information regarding the vehicle 50 is acquired and then a predetermined time has elapsed from the acquisition of the alighting information, the first determination unit 32 determines whether or not to cause the touch panel 22 or the speaker 24 configured to perform a notification operation to perform the notification operation and whether or not the notification operation of the touch panel 22 or the speaker 24 is necessary on the basis of the state information regarding the vehicle 50. The alighted condition is established, for example, when it is detected that any one of the doors of the vehicle 50 is brought into an open state from a closed state when the vehicle 50 is stopped.

The first determination unit does not determine whether or not the notification operation is necessary when boarding information indicating establishment of a boarded condition included in the state information is acquired until a predetermined time elapses since acquisition of alighting information indicating establishment of an alighted condition included in the state information. The boarded condition is established, for example, when it is detected that after the alighted condition is established, a door which has been in an open state is brought into a closed state and is again brought into an open state.

It is to be noted that the alighted condition or the boarded condition is not limited to be detected on the basis of the closed state or open state of a door, but whether or not the alighted condition or the boarded condition is established may be determined on the basis of detection results of various sensors mounted on the vehicle 50. The various sensors are, for example, a seating sensor for detecting that a user is seated on a seat of the vehicle 50, a steering holding sensor for detecting that a steering wheel of the vehicle 50 is being gripped, or the like which are mounted on the vehicle 50.

Figure 8:
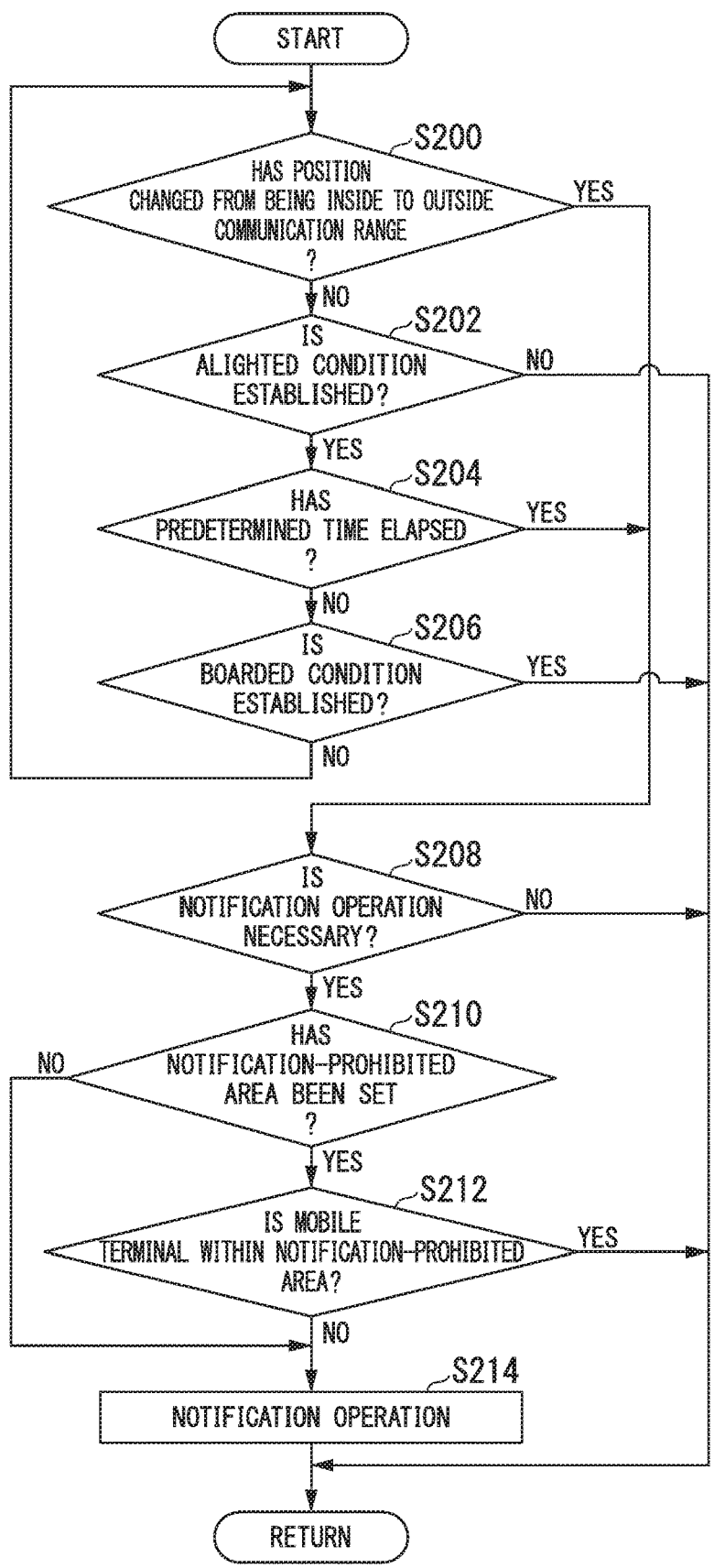
FIG. 8 is a flowchart showing a flow of processes executed by a control unit of a mobile terminal according to a second embodiment.

FIG. 8 is a flowchart showing a flow of processes executed by the control unit 30 of the mobile terminal 10 according to the second embodiment. First, the control unit 30 determines whether or not the mobile terminal 10 has changed in position from being inside the communication range of the communication unit 52 to outside the communication range (step S200). Upon determining that the mobile terminal 10 has not changed in position from being inside the communication range of the communication unit 52 to outside the communication range, the first determination unit 32 of the mobile terminal 10 determines whether or not an alighted condition is established on the basis of state information regarding the vehicle 50 received from the vehicle 50 (step S202). When the alighted condition is not established, one routine of this flowchart ends.

When the alighted condition is established, the first determination unit 32 determines whether or not a predetermined time has elapsed since the alighted condition was established (step S204). When the predetermined time has not elapsed since the alighted condition was established, the first determination unit 32 determines whether or not the boarded condition is established on the basis of the state information regarding the vehicle 50 received from the vehicle 50 (step S206).

When the boarded condition is not established, the procedure returns to the process of step S200, and when the boarded condition is established, one routine of this flowchart ends.

When the predetermined time has elapsed since the alighted condition was established or when it is determined in step S200 that the mobile terminal 10 has changed in position from being inside the communication range of the communication unit 52 to outside the communication range, the first determination unit 32 determines whether or not the notification operation is necessary (step S208). The first determination unit 32 determines, for example, whether or not a result of comparison between state information regarding the vehicle 50 which has been immediately previously received and a preset reference state(s) of the vehicle 50 in which the notification operation is unnecessary is that the state information regarding the vehicle 50 is different from the preset reference state.

The first determination unit 32 determines that the notification operation is necessary, for example, when the result of comparison between the state information regarding the vehicle 50 which has been immediately previously received and the preset reference state of the vehicle 50 in which the notification operation is unnecessary is that the state information regarding the vehicle 50 is different from the preset reference state.

When it is determined that the notification operation is unnecessary, the procedure of this flowchart ends. When it is determined that the notification operation is necessary, the second determination unit 34 determines whether or not the notification-prohibited area has been set (step S210). When the notification-prohibited area has not been set, the determination control unit 36 causes the touch panel 22 or the speaker 24 to perform the notification operation (step S214).

When the notification-prohibited area has been set, the second determination unit 34 determines whether or not the mobile terminal is located within the notification-prohibited area (step S212). When the mobile terminal is located within the notification-prohibited area, the determination control unit 36 terminates one routine of this flowchart without performing the notification operation. When the mobile terminal is not located within the notification-prohibited area, the determination control unit 36 causes the touch panel 22 or the speaker 24 to perform the notification operation (step S214). Then, one routine of this flowchart ends.

Figure 9:
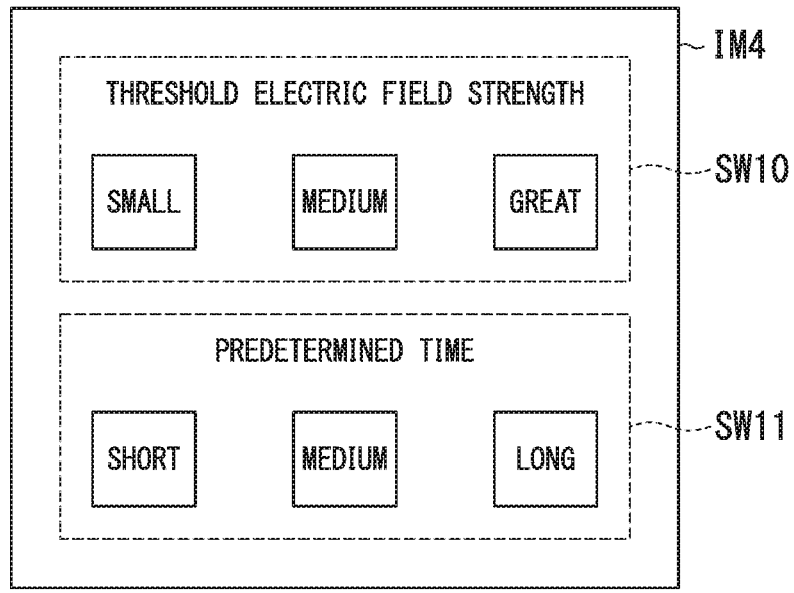
FIG. 9 is a diagram showing an exemplary interface screen for changing determination criteria.

By operating switches SW displayed on the touch panel 22 of the mobile terminal 10, the user can change the determination criteria of the above processes. FIG. 9 is a diagram showing an exemplary interface screen IM4 for changing the determination criteria. For example, a switch SW10 of a threshold field strength (see step S200) for defining the communication range and a switch SW11 for changing the predetermined time (see step S204) used for the first determination unit 32 to determine whether or not the mobile terminal 10 is present within the communication range are displayed on the interface screen IM4. By operating the switch SW10, the user can change the threshold time of the field strength for defining the communication range to great, medium, or small. By operating the switch SW11, the user can change the predetermined time for the first determination unit 32 to determine whether or not the mobile terminal 10 is present within the communication range to long, medium, or short. The control unit 30 (a change receiving unit) receives the determination criteria whose setting has been changed by the user and causes the storage unit 38 to store the received determination criteria. The control unit 30 executes processing on the basis of the stored determination criteria.

According to the second embodiment described above, the notification operation is performed as necessary when it is determined that the position of the mobile terminal 10 has not changed to being outside the communication range of the communication unit 52 until a predetermined time elapses since the mobile terminal 10 acquires the alighting information and that the mobile terminal or the vehicle 50 is not present within the notification-prohibited area. Thus, when the mobile terminal 10 is staying for a predetermined time in the vicinity of the position where the vehicle 50 is parked, that is, for example when a user who holds the mobile terminal 10 is staying for a predetermined time in a room, a shop, or the like near where the vehicle 50 is parked, it is possible to perform the notification operation as necessary even if the mobile terminal 10 has not exited the communication range.

Further, even when it is determined that the notification operation is to be performed, the mobile terminal 10 does not cause the notification operation to be performed when the mobile terminal or the vehicle 50 is present within the notification-prohibited area. Thus, normally, when a room, a shop, or the like near where the vehicle 50 is parked has been set as the notification-prohibited area, the notification system 1 can prevent provision of an annoying notification to the user even if a door of the vehicle 50 has been intentionally opened or unlocked.

Third Embodiment

A third embodiment will now be described. In the notification system 1 according to the first embodiment, a notification operation is performed as necessary when the mobile terminal 10 has changed in position from being inside the communication range of the communication unit 52 to outside the communication range and the mobile terminal or the vehicle 50 is not present within the notification-prohibited area. However, in a notification system 1A of the third embodiment, even when a mobile terminal 10A is present within the communication range of the communication unit 52, the mobile terminal 10A performs the notification operation as necessary, regardless of the presence of the mobile terminal 10A within the communication range of the communication unit 52, if an alighted condition is established, a stationary state of the mobile terminal is detected, and the mobile terminal or the vehicle 50 is not present within the notification-prohibited area. Differences from the notification system 1 of the first and second embodiments will be mainly described below.

Figure 10:
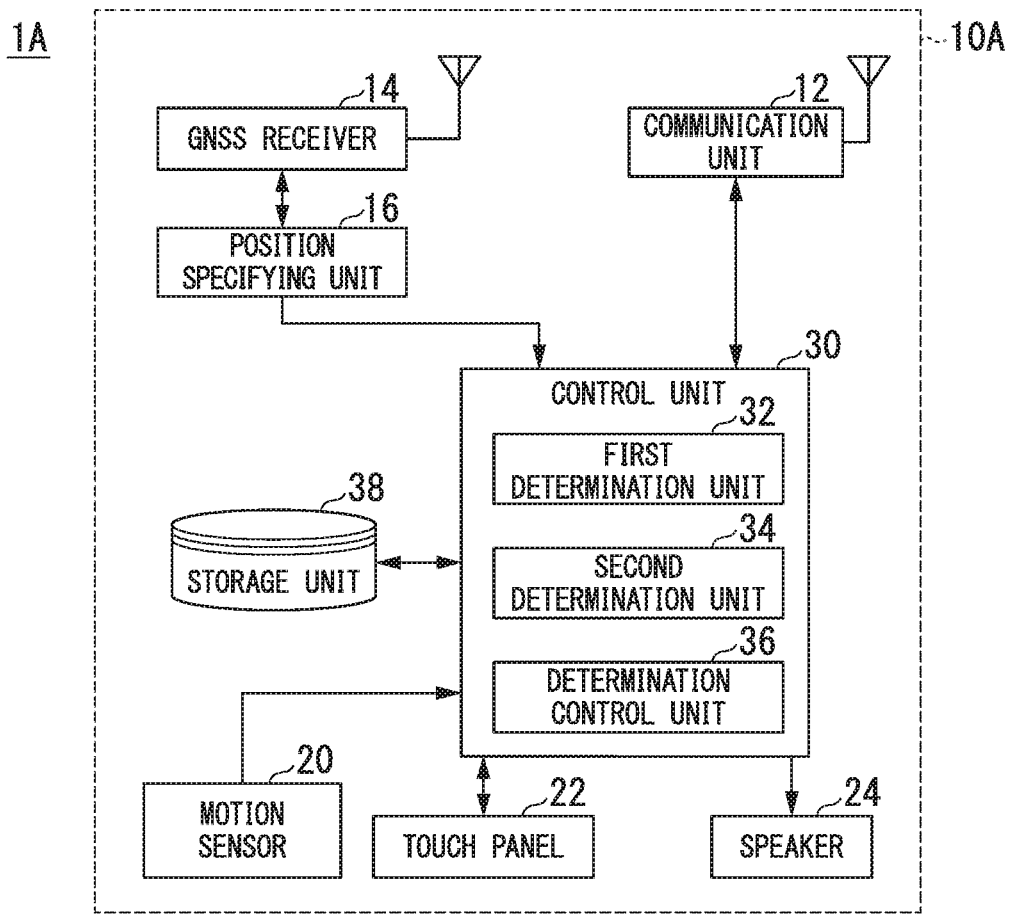
FIG. 10 is a diagram showing functional components of a mobile terminal according to a third embodiment.

FIG. 10 is a diagram showing functional components of the mobile terminal 10A according to the third embodiment. The mobile terminal 10A includes a motion sensor (a behavior detection unit) 20 in addition to the functional components of the mobile terminal 10 according to the first and second embodiments. The motion sensor 20 includes, for example, an acceleration sensor, a gyro sensor, or the like. The motion sensor 20 detects the presence or absence of movement of the mobile terminal 10A and outputs a signal indicating whether or not the mobile terminal 10A is in a stationary state. When alighting information indicating establishment of an alighted condition included in the state information regarding the vehicle 50 has been acquired and the mobile terminal 10A has been detected as being in a stationary state within the communication range by the motion sensor 20, the first determination unit 32 determines whether or not the notification operation is necessary on the basis of the state information regarding the vehicle 50.

Figure 11:
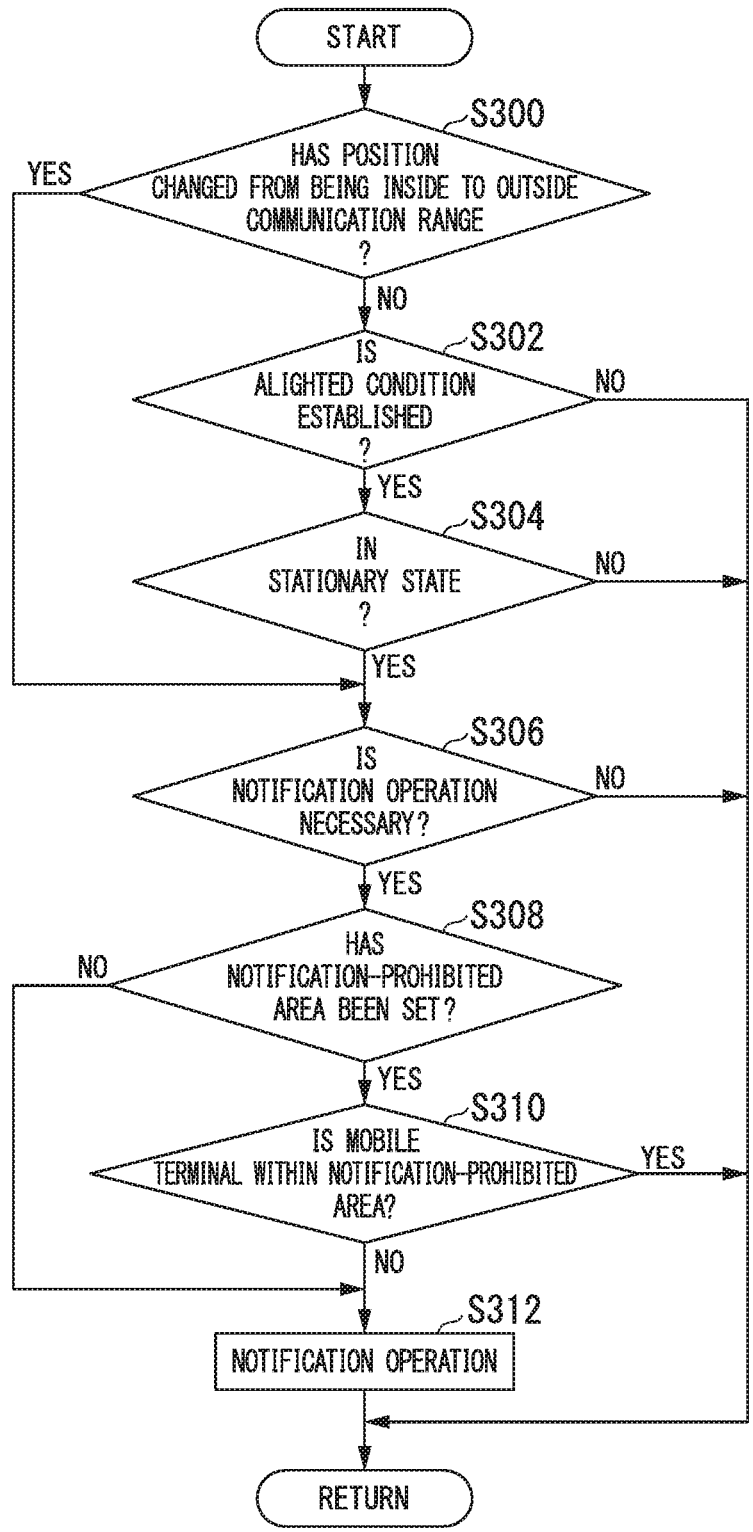
FIG. 11 is a flowchart showing a flow of processes executed by a control unit of a mobile terminal according to the third embodiment.

FIG. 11 is a flowchart showing a flow of processes executed by the control unit 30 of the mobile terminal 10A of the third embodiment. First, the control unit 30 determines whether or not the mobile terminal 10A has changed in position from being inside the communication range of the communication unit 52 to outside the communication range (step S300). Upon determining that the mobile terminal 10A has not changed in position from being inside the communication range of the communication unit 52 to outside the communication range, the first determination unit 32 of the mobile terminal 10A determines whether or not an alighted condition is established on the basis of state information received from the vehicle 50 (step S302). When the alighted condition is not established, one routine of this flowchart ends.

When the alighted condition is established, the first determination unit 32 determines whether or not the mobile terminal 10A is in a stationary state on the basis of state information received from the vehicle 50 (step S304). The first determination unit 32 determines that the mobile terminal 10A is in a stationary state when a signal indicating that the mobile terminal 10A is in a stationary state has been acquired from the motion sensor 20. When the mobile terminal 10A is not in a stationary state, one routine of this flowchart ends.

When the mobile terminal 10A is in a stationary state or when it is determined that the mobile terminal 10A has changed in position from being inside the communication range of the communication unit 52 to outside the communication range, the first determination unit 32 determines whether or not the notification operation is necessary (step S306). When it is determined that the notification operation is unnecessary, the procedure of this flowchart ends. When it is determined that the notification operation is necessary, the second determination unit 34 determines whether or not a notification-prohibited area has been set (step S308). When the notification-prohibited area has not been set, the determination control unit 36 causes the touch panel 22 or the speaker 24 to perform the notification operation (step S312).

When the notification-prohibited area has been set, the second determination unit 34 determines whether or not the mobile terminal is located within the notification-prohibited area (step S310). When the mobile terminal is located within the notification-prohibited area, the determination control unit 36 terminates one routine of this flowchart without providing notification. When the mobile terminal is not located within the notification-prohibited area, the determination control unit 36 causes the touch panel 22 or the speaker 24 to perform the notification operation (step S312). Then, one routine of this flowchart ends.

According to the third embodiment described above, when the alighting information has been acquired and the mobile terminal has been detected as being stationary within the communication range by the motion sensor 20, the mobile terminal 10A determines whether or not the notification operation is necessary on the basis of the state information. Thus, when the mobile terminal 10A is stationary at a position such as in the vicinity of the position where the vehicle 50 is parked, that is, for example when the user places the mobile terminal 10A on a table or the like in a room or a shop near where the vehicle 50 is parked, it is possible to perform the notification operation as necessary even if the mobile terminal 10 has not exited the communication range.

Further, even when it is determined that the notification operation is to be performed, the mobile terminal 10A does not cause the notification operation to be performed when the mobile terminal or the vehicle 50 is present within the notification-prohibited area. Thus, normally, when a room, a shop, or the like near where the vehicle 50 is parked has been set as the notification-prohibited area, the notification system 1A can prevent provision of an annoying notification to the user even if the mobile terminal 10A is placed on a table or the like in a room or a shop near where the vehicle 50 is parked intentionally.

In each of the above-described embodiments, the control unit 30 may determine whether or not the position of the mobile terminal specified by the mobile terminal 10 or 10A matches the position of a home stored in advance in the storage unit 38 and may not cause the notification operation to be performed when the position of the mobile terminal matches the position of the home even if the mobile terminal 10 or 10A is out of the communication range of the communication unit 52, even if the mobile terminal 10 or 10A is kept in a state in which the alighted condition is established for a predetermined time within the communication range of the communication unit 52, or even if the mobile terminal 10 or 10A is brought into a stationary state.

In the above embodiments, the processes of the first to third embodiments have been described as those of different embodiments. However, the processes of the first to third embodiments may be executed in parallel. In addition, an appropriate combination of the processes of the embodiments may be executed. For example, the processes of the second and third embodiments may be combined such that the notification operation is performed as necessary in any of (1) the case in which the mobile terminal 10 has changed from being inside the communication range of the communication unit 52 to outside the communication range and the mobile terminal or the vehicle 50 is not present within the notification-prohibited area, (2) the case in which a predetermined time has elapsed in a state in which an alighted condition is established and the mobile terminal or the vehicle 50 is not present within the notification-prohibited area even if the mobile terminal is within the communication range of the communication unit 52, and (3) the case in which an alighted condition is established, the mobile terminal is detected as being in a stationary state, and the mobile terminal or the vehicle 50 is not present within the notification-prohibited area even if the mobile terminal 10 is within the communication range of the communication unit 52.

Although modes for carrying out the present invention have been described above by way of embodiments, the invention is not limited to these embodiments at all and various modifications and substitutions can be made without deviating from the gist of the invention.

REFERENCE SIGNS LIST 1, 1A Notification system
10, 10A Mobile terminal
12 Communication unit (receiving unit)
14 GNSS receiver
16 Position specifying unit
20 Motion sensor (behavior detection unit)
22 Touch panel (notification unit)
24 Speaker (notification unit)
30 Control unit (change receiving unit)
32 First determination unit
34 Second determination unit
36 Determination control unit
38 Storage unit
50 Vehicle
52 Communication unit (in-vehicle communication device)
54 Vehicle-side GNSS receiver
56 Vehicle-side position specifying unit
60 Various vehicle state sensors
62 Various in-vehicle devices
64 Battery
70 Integrated control unit

What is claim is:

1. A notification system comprising:
an in-vehicle communication device mounted on a vehicle and configured to transmit state information regarding the vehicle to surroundings of the vehicle; and
a mobile terminal including a receiving unit configured to receive the state information from the in-vehicle communication device,
wherein the mobile terminal further includes:

a notification unit configured to perform a notification operation for a user;

a first determination unit configured to determine whether or not the notification operation for the user is necessary on the basis of the state information received by the receiving unit;

a second determination unit configured to acquire position information of at least one of the mobile terminal or the vehicle and to determine whether or not the acquired position information is within a preset notification-prohibited area; and a determination control unit configured to determine whether or not to cause the notification unit to perform the notification operation on the basis of determination results of the first determination unit and the second determination unit.

2. The notification system according to claim 1, wherein the determination control unit is configured to determine not to cause the notification unit to perform the notification operation when the first determination unit has determined that the notification operation is necessary and the second determination unit has determined that the mobile terminal or the vehicle is present within the notification-prohibited area.

3. The notification system according to claim 2, wherein the first determination unit is configured to compare the state information received by the receiving unit with a preset reference state that is a state of the vehicle in which the notification operation is unnecessary and to determine that the notification operation is necessary when a result of the comparison is that the received state information and the preset reference state are different.

4. The notification system according to claim 3, wherein the mobile terminal further includes a change receiving unit configured to receive a change of the reference state from the user.

5. The notification system according to claim 1, wherein the in-vehicle communication device is configured to periodically transmit the state information regarding the vehicle, and the first determination unit is configured to determine whether or not a position of the mobile terminal has changed from being inside a communication range of the in-vehicle communication device to outside the communication range on the basis of a reception result of the receiving unit and to determine, when it is determined that the position of the mobile terminal has changed from being inside the communication range of the in-vehicle communication device to outside the communication range, whether or not the notification operation is necessary on the basis of the state information received immediately before the change.

6. The notification system according to claim 5, wherein the first determination unit is configured to determine whether or not the notification operation is necessary on the basis of the state information when a predetermined time has elapsed since acquisition of alighting information indicating establishment of an alighted condition included in the state information.

7. The notification system according to claim 6, wherein the first determination unit is configured not to determine whether or not the notification operation is necessary when boarding information indicating establishment of a boarded condition included in the state information is acquired until the predetermined time elapses since the acquisition of the alighting information indicating establishment of the alighted condition included in the state information.

8. The notification system according to claim 6, wherein the alighted condition is established when it is detected that any door of the vehicle is brought into an open state from a closed state when the vehicle is stopped.

9. The notification system according to claim 6, wherein the mobile terminal further includes a change receiving unit configured to receive a change of the predetermined time from the user.

10. The notification system according to claim 5, wherein the mobile terminal further includes a behavior detection unit configured to detect whether or not the mobile terminal is in a stationary state, wherein the first determination unit is configured to determine whether or not the notification operation is necessary on the basis of the state information when alighting information indicating establishment of an alighted condition included in the state information has been acquired, it is determined that the position of the mobile terminal is within the communication range on the basis of the reception result of the receiving unit, and it is detected by the behavior detection unit that the mobile terminal is in the stationary state.

11. The notification system according to claim 5, wherein the first determination unit is configured to determine that the position of the mobile terminal has changed from being inside a communication range of the in-vehicle communication device to outside the communication range when an electric field strength in the reception result when the receiving unit periodically receives the state information has changed from a state in which the electric field strength is greater than or equal to a reference to a state in which the electric field strength is less than the reference.

12. The notification system according to claim 11, wherein the mobile terminal further includes a change receiving unit configured to receive a change of the reference of the electric field strength from the user.

* * * * *